United States Patent Office 2,914,838
Patented Dec. 1, 1959

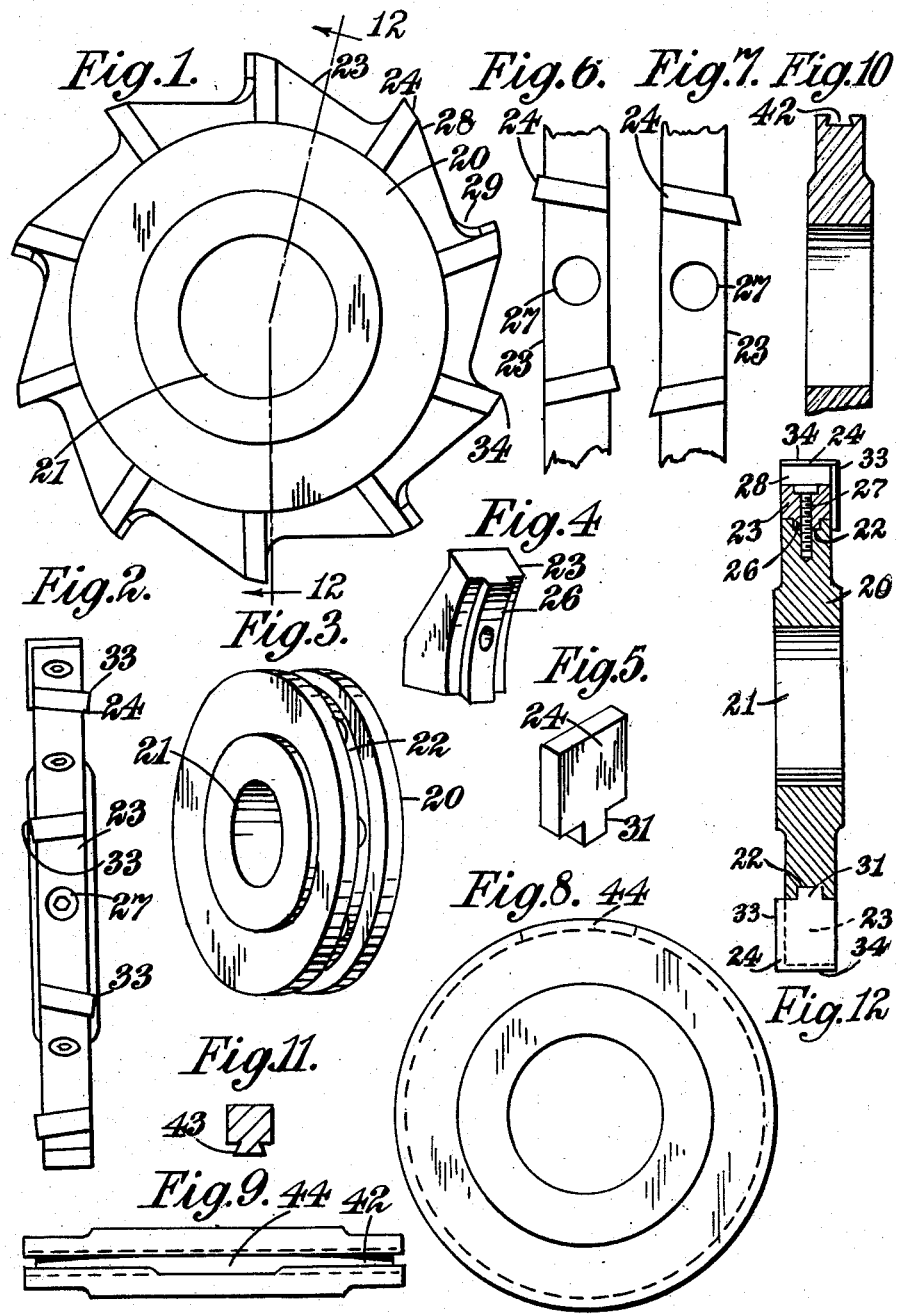

2,914,838

MILLING CUTTER

Herbert Wilfred Robinson, Sheffield, England, assignor to Firth Brown Tools Limited, Sheffield, England, a British company Application February 11, 1955, Serial No. 487,608

Claims priority, application Great Britain March 4, 1954

3 Claims. (Cl. 29—105)

The invention relates to milling cutters of the kind having inserted cutting blades and has for an object the provision of improved means for securing the blades. A further object of one form of the invention is the provision of a construction which enables the blades to be adjusted laterally for the purpose of restoring loss in the width of the cutter due to wear and sharpening.

The invention provides a milling cutter comprising a circular body, a plurality of "segments" around the body, cutting blades between the segments and protruding therefrom and means for drawing the segments inwardly towards the body, whereby to clamp the blades between the ends of the segments.

The expression "segment" is used herein to refer to a member having an inner arcuate surface conforming to the circumferential surface of the body. The outer surface of the member may also be arcuate or, when the blades have cutting edges on the circumference of the cutter, it may be shaped to back-up the rear face of the leading blade and to form a gullet in front of the following blade.

Preferably the body is provided with a circumferential groove (or more than one such groove) and the segments have on their inner surfaces arcuate tongues which fit into the groove (or grooves) and serve to locate the segments laterally of the body. Clamping screws passing through the segments (e.g. one per segment) into the body may constitute the means for drawing the segments inwardly towards the body.

When the body has a groove as just described, it is preferred that the blades have tongues which extend into the groove. The tongues serve to locate the blades laterally and, when the blades have cutting edges on their sides, the side faces of the tongues may be ground away to permit lateral adjustment of the blades to compensate for loss of width on sharpening.

The ends of the segments may be parallel to the axis of the cutter or they may be oblique to the axis so that the blades will have a natural rake angle—positive or negative according to the side of the body from which they protrude—for cutting by their side edges and a shear angle for cutting edges on the circumference. Similarly the ends of the segments may be radial when the blades will be without rake angle for cutting edges on the circumference or a rake angle may be provided by making the ends non-radial. The blade angle may vary from blade to blade and the blades may protrude from opposite sides alternately. When, as is preferred, the blades are each of uniform thickness the adjacent ends of the segments will be parallel to each other.

Some specific constructions of cutters according to the invention will now be described by way of example of how the invention may be carried into effect and with reference to the accompanying drawings, in which:

Figure 1 is a side view of one of the cutters,

Figure 2 is an edge view of the cutter shown in Figure 1,

Figure 3 is a perspective view of the body of the cutter shown in Figures 1 and 2, Figure 4 is a perspective view of one of the segments used in the cutter, Figure 5 is a perspective view of one of the blades (unground) used in the cutter, Figures 6 and 7 are edge views illustrating how positive and negative rakes on the side edges of the blades may be obtained without alteration of the segments, Figure 8 is a side view of another form of cutter body, Figure 9 is an edge view of the body shown in Figure 8, Figure 10 is a section through the body, Figure 11 is a section through one of the segments, and Figure 12 is a section on the line 12—12 in Figure 1.

In the first example, shown in Figures 1–7 and 12, the cutter has a body 20 in the form of a circular disc with a central bore 21 for the reception of a cutter spindle. Around the circumference of the disc there is a rectangular section groove 22. The cutter has ten segments 23 fitted around the body with spaces between their ends for the reception of cutter blades 24 which may be of high speed steel, sintered tungsten carbide— so-called "hard metal"—or other suitable material. The segments have tongues 26 on their inner, arcuate, surfaces which fit into the groove 22 in the body. Each segment 23 is attached to the body by a single, central screw 27 passing through the segment radially into the body, the head of the screw being received in a counterbore in the segment. The outer circumferential surface of each of the segments is shaped, as above mentioned, at its leading end 28 to back up the leading blade 24 and at its trailing end to provide a gullet 29 in front of the following blade.

The blades 24 are of flat section and have tongues 31 which initially fit closely within the groove 22. Each blade is sharpened to provide a side cutting edge 33 and a circumferential cutting edge 34 and alternate blades have their side cutting edges protruding from opposite sides of the body, as shown in Figure 2. The ends of the adjacent segments are shaped to provide both sets of blades with negative side rake angles (see Figures 2 and 6). The circumferential length of the segments is such that when the screws are tightened, the blades are tightly clamped between the ends of the segments with a wedging action.

When, as a result of wear and sharpening of the blades, the width of the cutter has been reduced, the width may be restored by loosening the segments, removing the cutters and grinding off the appropriate sides of the tongues 31 (i.e. the sides nearer to the side cutting edges) by slightly more than the amount by which the blade has lost width and then reassembling the cutter with the blades adjusted outwardly to engage the tongues with the sides of the groove. The blades may all then be ground to provide the correct width and sharpened in the usual way. Figure 7 illustrates how positive side rake angles may be obtained by arranging for the blades to project from opposite sides of the body to those employed in Figure 6.

In a second example (Figures 8–11), the construction is as just described except that the sides of the groove 42 are undercut to provide a dovetail and the tongues 43 on the segments and blades are correspondingly shaped. At one circumferential position 44 one side of the groove is cut away for the length of a segment, to permit insertion of the segments and blades.

In each of the above examples the tongues on the segments have clearance from the base of the groove, sufficient to permit the necessary inward clamping movement of the segments.

The invention is not restricted to the constructional details set forth in the above examples. For instance the tongue may be provided on the body, as a circumferential rib, and the groove may be formed in the segments and blades. Further the tongues and grooves may be of cross-section other than those described. They may for instance be of triangular or half-round section or of any desired shape which permits insertion of the tongue into the groove. Again more than one clamping screw may be provided for each segment and these screws may be of any suitable type.

In each of the above constructions the segments may be cut from an annular ring, sufficient material being removed to allow for the insertion of the blades.

I claim:

1. A milling cutter comprising a circular body having a continuous circumferential groove in the circumferential surface, a plurality of segments having inner arcuate surfaces which extend around the outside of the body on each side of the groove and having on their inner arcuate surfaces intermediate in the width thereof tongues which are received within the groove, the ends of the segments being oblique to the axis of the body, flat cutting blades between the segments around the outside of the circumferential surface of the body, said blades protruding from between the segments, and means for drawing the segments inwardly of the body, said means holding the blades obliquely to the said axis, between the ends of the segments.

2. A milling cutter as claimed in claim 1 in which the blades have their cutting edges protruding from the side faces of the segments on at least one side of the body, whereby the aforesaid obliquity of the blades provides a rake angle for the edges.

3. A milling cutter as claimed in claim 1 in which the blades have tongues received within the groove.

References Cited in the file of this patent

UNITED STATES PATENTS

| | | |
|---|---|---|
| 604,776 | Morton | May 31, 1898 |
| 646,284 | Hilton | Mar. 27, 1900 |
| 866,372 | Maltby | Sept. 17, 1907 |
| 1,078,193 | Gorton | Nov. 11, 1913 |
| 1,171,430 | Gorton | Feb. 15, 1916 |
| 1,194,865 | Muller | Aug. 15, 1916 |
| 1,274,255 | Freas | July 3, 1918 |
| 1,884,158 | Olson | Oct. 25, 1932 |
| 2,164,620 | Parish | July 4, 1939 |
| 2,310,826 | Adams | Feb. 9, 1943 |
| 2,374,528 | Emde | Apr. 24, 1945 |
| 2,407,921 | Deliso | Sept. 17, 1946 |
| 2,422,111 | Lundberg | June 10, 1947 |
| 2,665,893 | Ball | Jan. 12, 1954 |
| 2,688,792 | Sunnen | Sept. 14, 1954 |
| 2,693,020 | Pelphrey | Nov. 2, 1954 |

FOREIGN PATENTS

| | | |
|---|---|---|
| 463,500 | France | Dec. 18, 1913 |
| 111,914 | Great Britain | Dec. 19, 1917 |
| 119,569 | Great Britain | Oct. 10, 1918 |
| 649,852 | Germany | Sept. 4, 1937 |

UNITED STATES PATENT OFFICE
CERTIFICATE OF CORRECTION

Patent No. 2,914,838                  December 1, 1959

Herbert Wilfred Robinson

It is hereby certified that error appears in the above numbered patent requiring correction and that the said Letters Patent should read as corrected below.

In the heading to the printed specification, line 7, date of priority, for "March 4, 1954" read -- March 2, 1954 --.

Signed and sealed this 5th day of June 1960.

(SEAL)
Attest:

KARL H. AXLINE
Attesting Officer

ROBERT C. WATSON
Commissioner of Patents